US010862972B2

(12) United States Patent
Sung et al.

(10) Patent No.: US 10,862,972 B2
(45) Date of Patent: Dec. 8, 2020

(54) METHOD AND SYSTEM TO TRANSMIT AND RECEIVE DATA PACKETS THROUGH AT LEAST ONE END-TO-END CONNECTION

(71) Applicant: Pismo Labs Technology Limited, Kowloon (HK)

(72) Inventors: Patrick Ho Wai Sung, Hong Kong (HK); Ho Ming Chan, Hong Kong (HK); Kit Wai Chau, Hong Kong (HK); Min-Fu Tsai, New Taipei (TW)

(73) Assignee: Pismo Labs Technology Limited, Kowloon (HK)

( * ) Notice: Subject to any disclaimer, the term of this patent is extended or adjusted under 35 U.S.C. 154(b) by 1081 days.

(21) Appl. No.: 14/125,951

(22) PCT Filed: Mar. 28, 2013

(86) PCT No.: PCT/IB2013/052490
§ 371 (c)(1),
(2) Date: Apr. 8, 2014

(87) PCT Pub. No.: WO2014/155155
PCT Pub. Date: Oct. 2, 2014

(65) Prior Publication Data
US 2017/0111454 A1    Apr. 20, 2017

(51) Int. Cl.
*H04L 29/08*    (2006.01)
*H04L 12/64*    (2006.01)

(52) U.S. Cl.
CPC .......... *H04L 67/14* (2013.01); *H04L 12/6418* (2013.01); *H04L 2012/6443* (2013.01)

(58) Field of Classification Search
CPC ............... H04L 67/14; H04L 12/6418; H04L 2012/6443; H04L 41/22; H04L 45/245;
(Continued)

(56) References Cited

U.S. PATENT DOCUMENTS 5,625,877 A * 4/1997 Dunn ................ H04W 72/0406
370/329
8,261,089 B2 * 9/2012 Leon Cobos ........... G06F 21/43
713/172

(Continued)

FOREIGN PATENT DOCUMENTS

| CN | 101986799 A | 3/2011 | |
|---|---|---|---|
| WO | 2009144528 A1 | 12/2009 | |
| WO | WO 2009144528 A1 * | 12/2009 | ........... H04L 45/121 |

OTHER PUBLICATIONS

International Search Report in International Application No. PCT/IB2013/052490, dated Jan. 9, 2014.

(Continued)

*Primary Examiner* — Tan Doan
(74) *Attorney, Agent, or Firm* — FisherBroyles, LLP

(57) ABSTRACT

A method and system for transmitting and receiving data packets between two network nodes via one or more end-to-end connections. An interface is provided for selecting one or more possible end-to-end connection(s) or established end-to-end connection(s). The method and system may further comprise receiving a policy, wherein one or more selected end-to-end connections are established based, at least in part, on the policy. The policy may also restrict or promote selection of certain established end-to-end connection(s) via the interface provided. The selected and established end-to-end connection(s) are used for transmitting and receiving data packets.

20 Claims, 7 Drawing Sheets

(58) Field of Classification Search
CPC .......... H04L 41/0896; H04W 36/0027; H04W 76/025
USPC ........................................................ 709/227
See application file for complete search history.

(56) References Cited

U.S. PATENT DOCUMENTS

| | | | |
|---|---|---|---|
| 2006/0039366 A1* | 2/2006 | Ghosh | H04L 45/00 370/360 |
| 2008/0080419 A1* | 4/2008 | Cole | H04L 12/5692 370/329 |
| 2009/0067324 A1* | 3/2009 | Licardie | H04L 43/0811 370/225 |
| 2009/0097418 A1* | 4/2009 | Castillo | H04L 41/12 370/255 |
| 2009/0161633 A1* | 6/2009 | Chen | H04M 1/2745 370/335 |
| 2010/0097956 A1* | 4/2010 | Tauil | H04W 8/18 370/254 |
| 2010/0153969 A1* | 6/2010 | Dyba | H04L 69/14 719/315 |
| 2013/0182601 A1* | 7/2013 | Bandyopadhyay | H04L 45/245 370/252 |
| 2014/0315536 A1* | 10/2014 | Chow | H04W 8/18 455/419 |

OTHER PUBLICATIONS

Written opinion of the International Searching Authority in International Application No. PCT/IB2013/052490, dated Jan. 9, 2014.

\* cited by examiner

[Fig. 1]
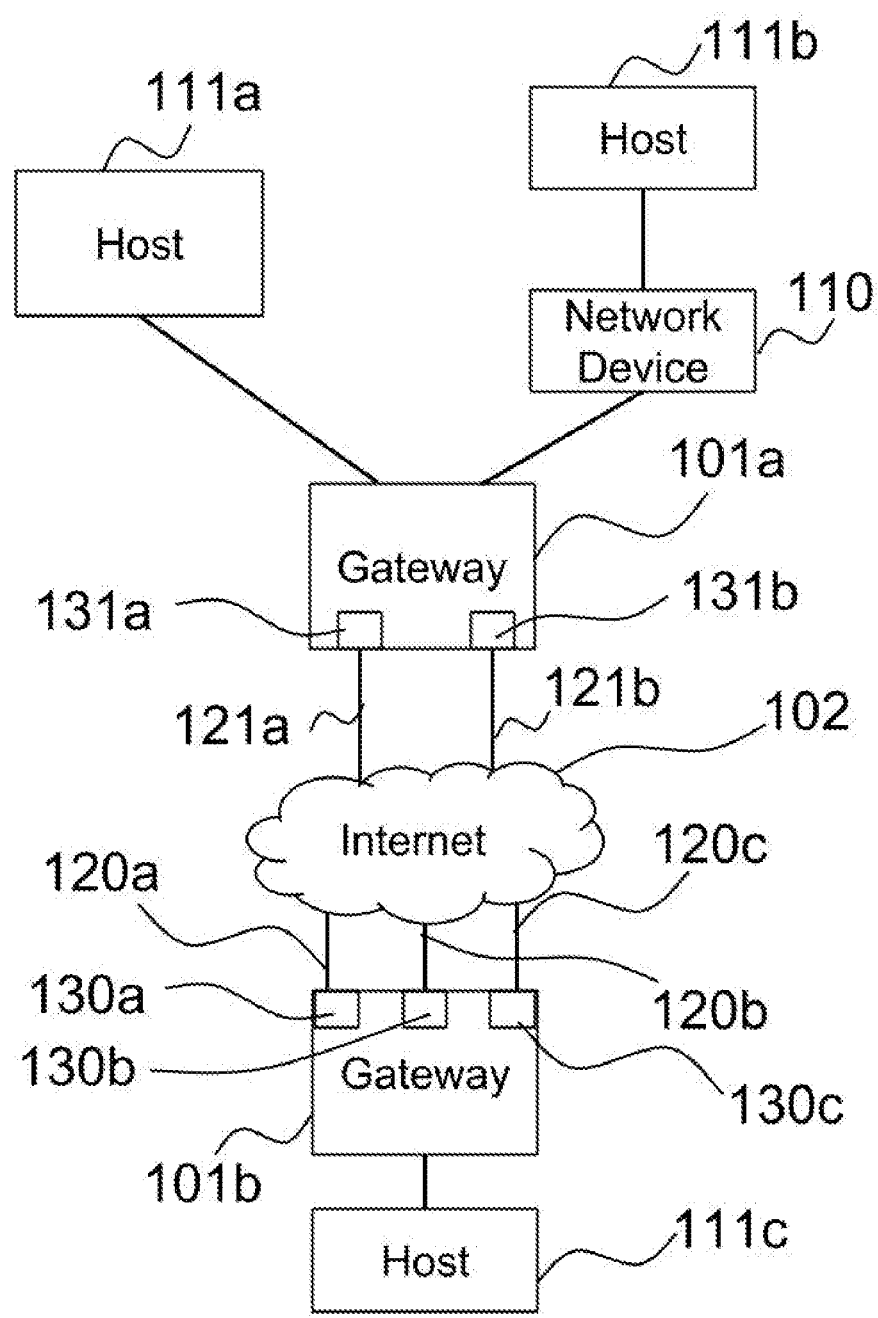

[Fig. 0002]
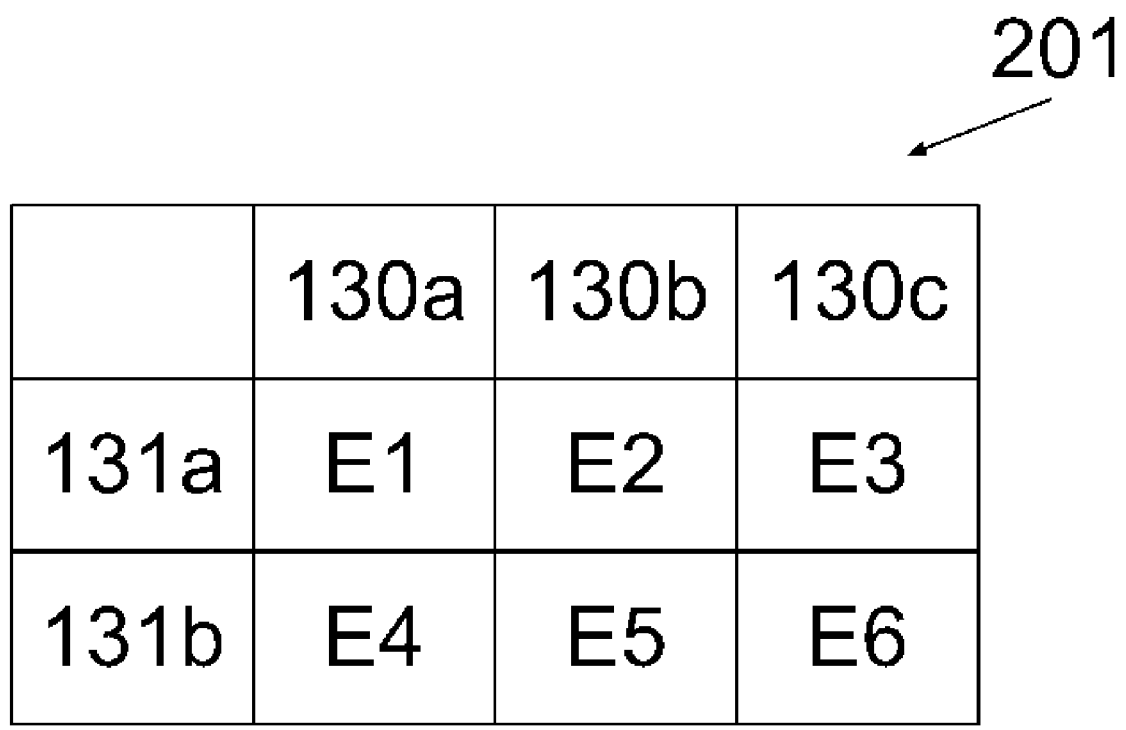

[Fig. 0003]
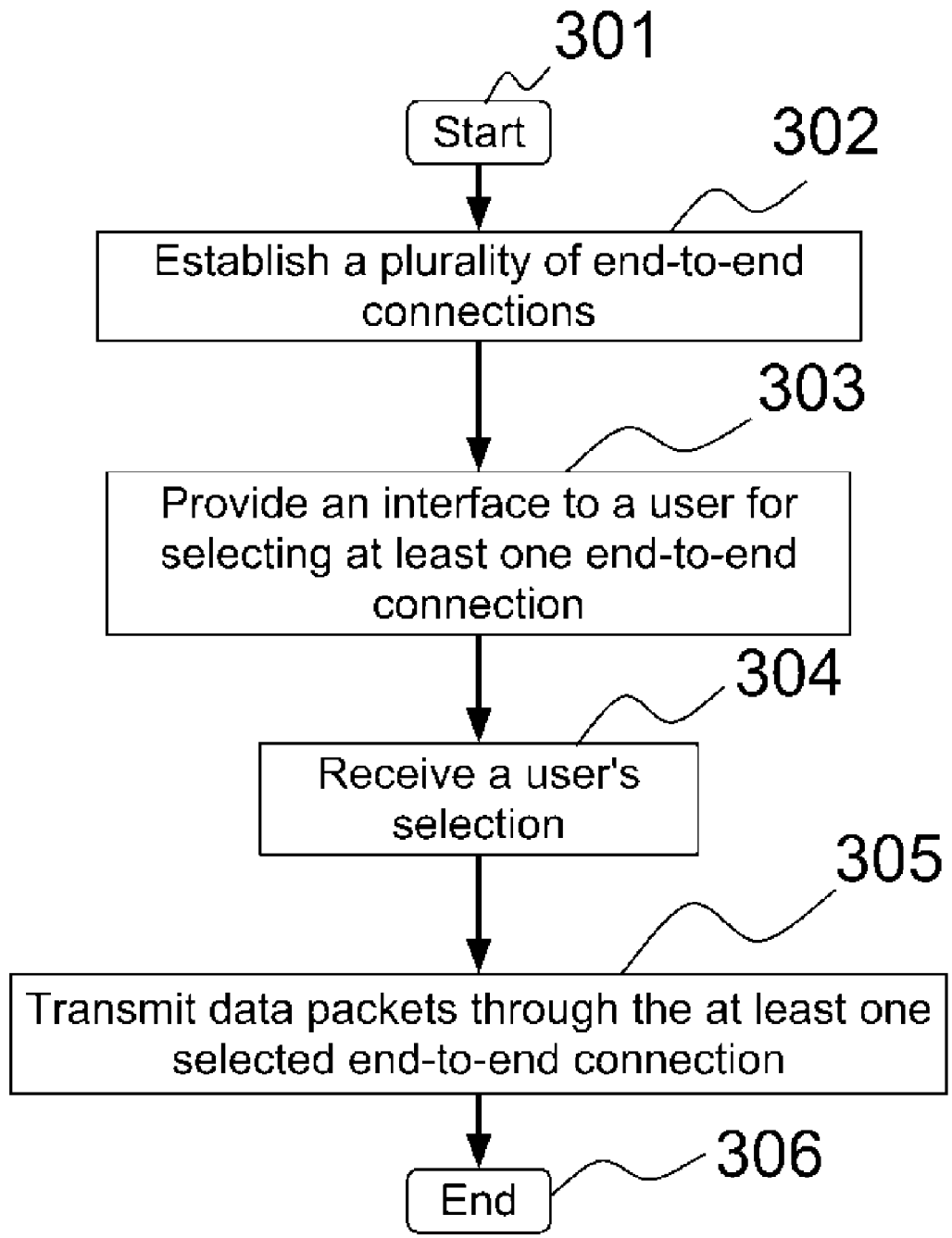

[Fig. 0004]
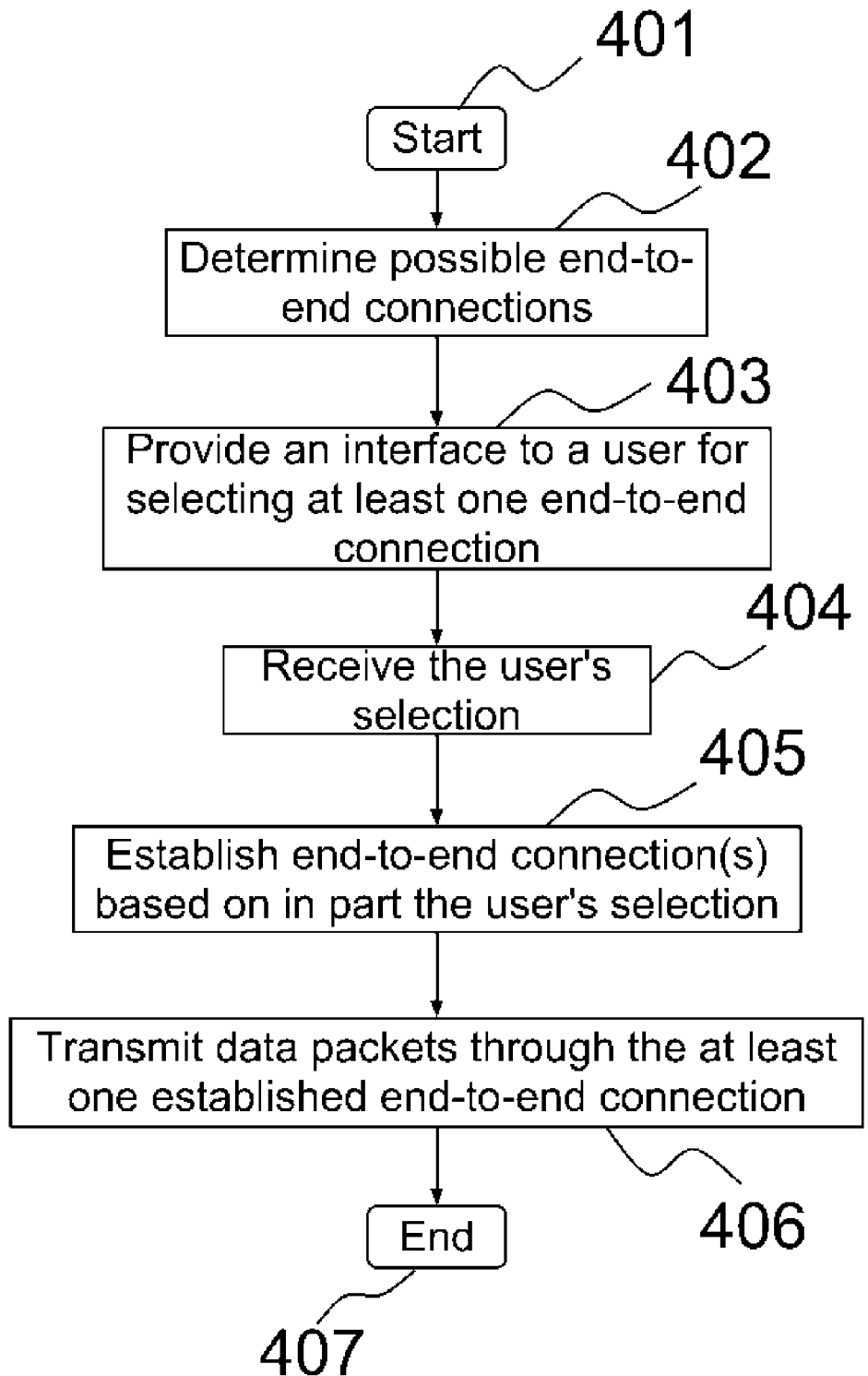

[Fig. 0005]
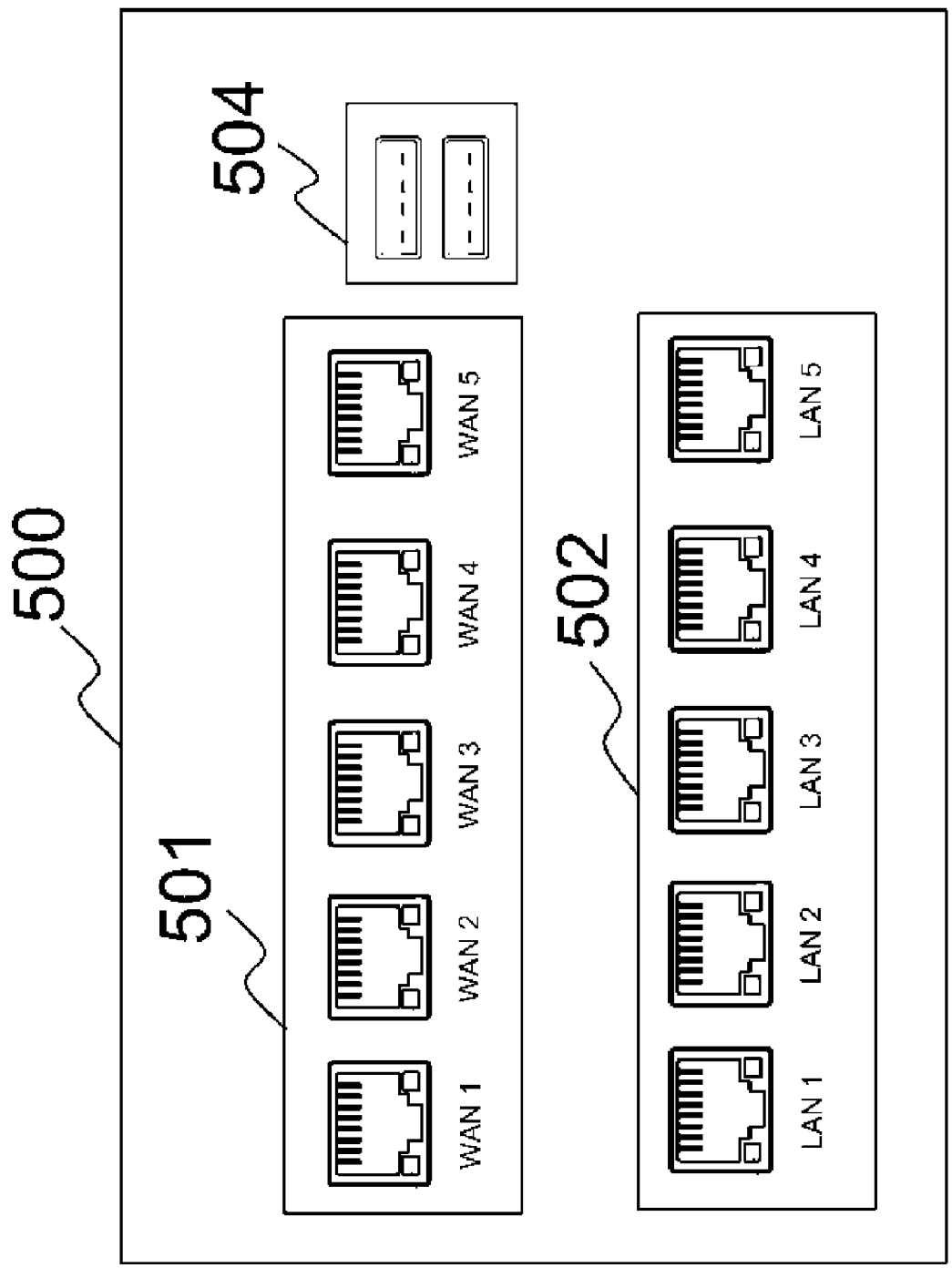

[Fig. 0006]
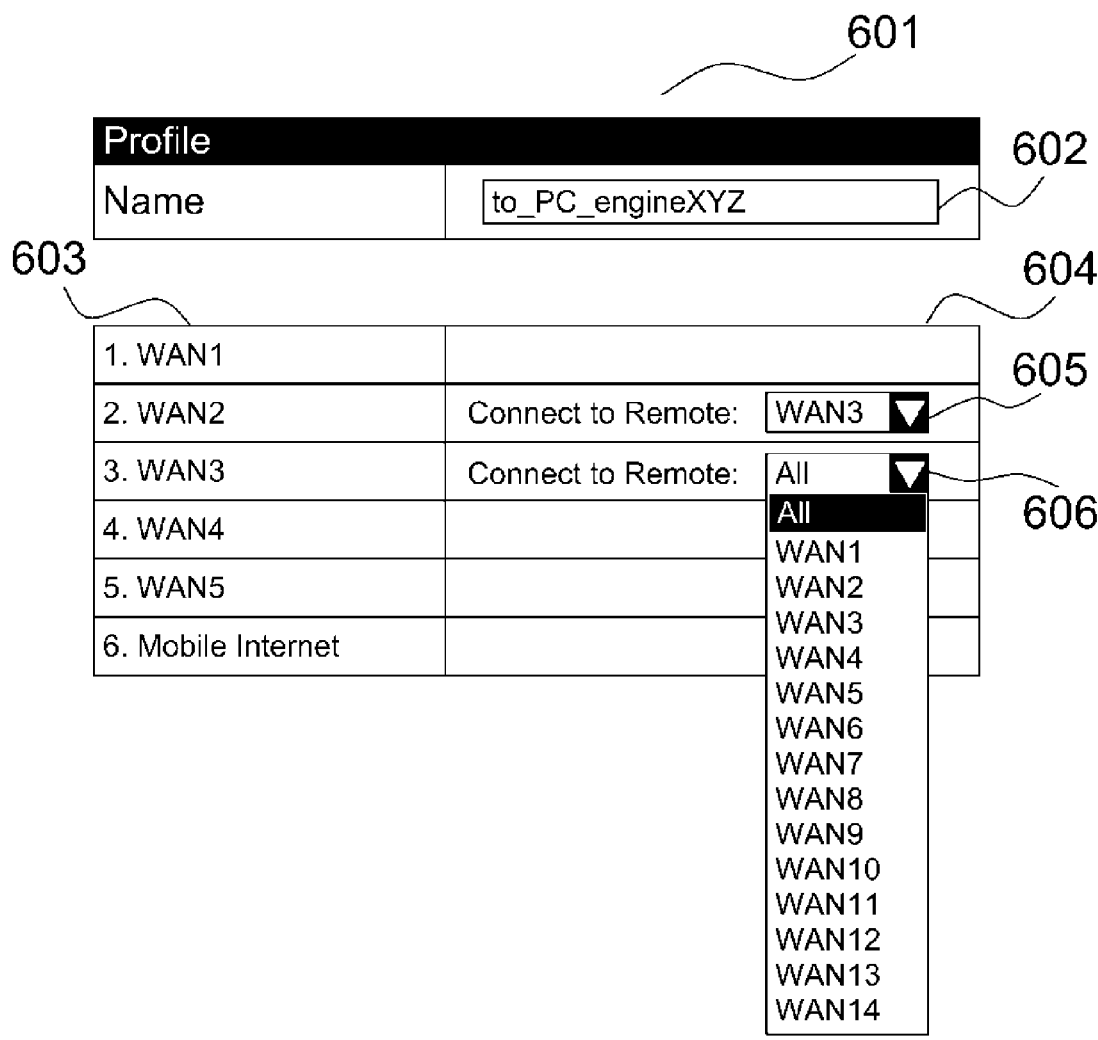

[Fig. 0007]
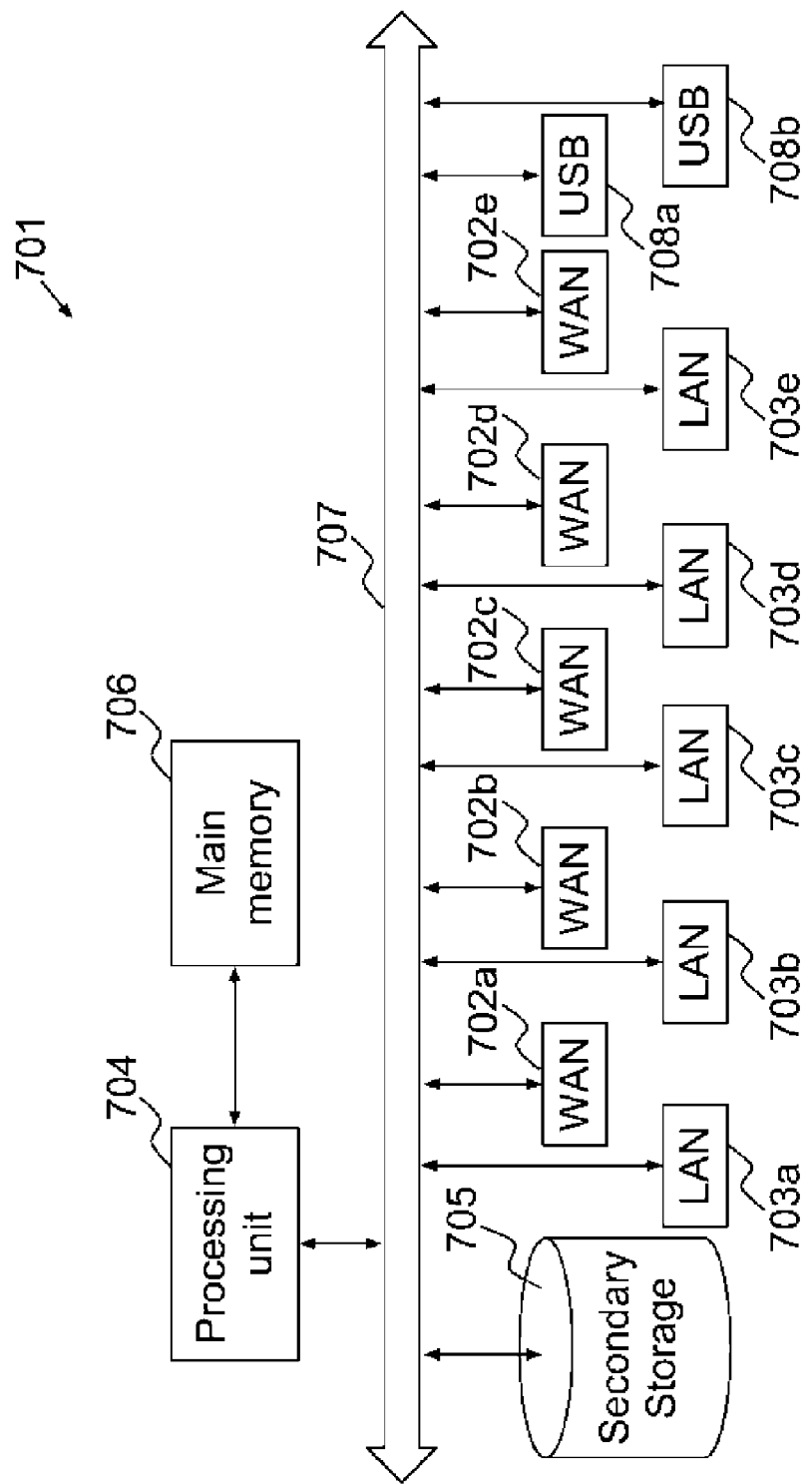

METHOD AND SYSTEM TO TRANSMIT AND RECEIVE DATA PACKETS THROUGH AT LEAST ONE END-TO-END CONNECTION

TECHNICAL FIELD

The invention relates generally to transmitting and receiving data packets via one or more end-to-end connections, more particularly, to choose one or more end-to-end connections from a plurality of end-to-end connections based on a policy.

BACKGROUND ART

When there is a plurality of end-to-end connections between two network nodes, the characteristics of the end-to-end connections may be different. For example, bandwidth of an end-to-end connection may be higher than that of another end-to-end connection. In another example, latency in one end-to-end connection may be smaller than that in another end-to-end connection. As data packet transmission and receiving requirements may be different for each application, user, and address, not all of the end-to-end connections are suitable for transmitting and receiving data packets. Using an unstable end-to-end connection to transfer and receive data packets may impact network performance significantly.

This situation is more undesirable if a session is using a plurality of end-to-end connections. In such case, a poor performance of one end-to-end connection may affect the overall performance of the session. For example, a file transfer application uses a TCP session to transfer a file from one network node to another network node and the TCP session is using a plurality of end-to-end connections. If one of the end-to-end connection experiences a 50% packet drop while other end-to-end connection experiences no packet drop, the file transfer application may experience a 50% packet drop.

In view of foregoing, it would be desirable to provide a technique to allow a user to select at least one end-to-end connection between two network nodes for transmitting and receiving data packets. More particularly, it would be desirable to provide a technique to allow a user to choose at least one end-to-end connection between two network nodes for transmitting and receiving particular data packets, wherein the at least one end-to-end connection satisfies a policy. More particularly, the policy is related to the time, expiration, location, network protocol, user, and/or application that the selected at least one end-to-end connection uses to transmit and receive the data packets.

SUMMARY OF INVENTION

According to the present invention, a technique for allowing a user to select at least one end-to-end connection between two network nodes for transmitting and receiving data packets is provided. In one of the embodiments of the present invention, a method comprises the processes of determining the number of possible end-to-end connections between the first network node and the second network node; assigning an identity to each of the possible end-to-end connections; providing an interface for selecting at least one possible end-to-end connection; receiving selection information; establishing at least one possible end-to-end connection based on in part of the received selection information; transmitting and receiving data packets through the established at least one end-to-end connection.

In accordance with other aspects of the present invention, the method may further comprise the process of receiving a policy. Establishment of the at least one end-to-end connection is based on in part the received policy. The received policy may contain information related to time, expiration, location, network protocol, user, application and/or other information that is used to determine the conditions that the at least one end-to-end connection is to be established.

In accordance with other aspects of the present invention, the method may further comprise a process of providing recommendation information to the user to assist the user to select at least one end-to-end connection. In accordance with other aspects of the present invention, the method may further comprise the process of providing recommendation information to the user to assist the user to create a policy.

In accordance with other aspects of the present invention, the interface provided to a user for selecting at least one end-to-end connection is a user interface (UI). The UI may be implemented through a web browser or an application. In accordance with other aspects of the present invention, the interface provided to a user for selecting at least one end-to-end connection is an application programming interface (API). The API may be used by an application, which receives selection information of the at least one end-to-end connection from a user or another application and then transmits the selection information to the network node. The API may further be used for the receiving the recommendation and transmit the recommendation to the user or another application.

The selection of end-to-end connection is different from route selection in routing protocol as there is no routing table or route information exchange. The selection of end-to-end connection is also different from configuring policy for transmitting packets as end-to-end connection is for both receiving and transmitting packets.

DISCLOSURE OF INVENTION

End-to-End Connections

According to one of the embodiments of the present invention illustrated in FIG. 1, gateway 101a connects to Internet 102 using network access links 121a and 121b via network interface 131a and 131b respectively. Gateway 101b connects to Internet 102 using network access links 120a, 120b and 120c via network interface 130a, 130b and 130c respectively. Therefore, a data packet from gateway 101a may arrive at gateway 101b through one of network access links 121a and 121b to Internet 102 first, then through one of network access links 120a, 120b and 120c. Therefore, gateways 101a and 101b are capable of establishing a plurality of end-to-end connections using network access links 120a, 120b, 120c, 121a and 121b.

In one of the embodiments, not all of the network interfaces comprised in gateway 101a are being used by gateway 101a, i.e., gateway 101a comprises a plurality of network interfaces and uses only network interfaces 131a and 131b from the plurality of network interfaces.

Embodiments concerning gateway 101a in this present invention are also applicable to gateway 101b.

FIG. 2 illustrates a table representing six end-to-end connections, namely E1, E2, E3, E4, E5 and E6, between gateways 101a and 101b using network access links 120a, 120b, 120c, 121a and 121b. End-to-end connection E1 is established using network access links 120a and 121a through network interfaces 130a and 131a respectively. End-to-end connection E2 is established using network access links 120b and 121a through network interfaces 130b and 131*a* respectively. End-to-end connection E3 is established using network access links 120*c* and 121*a* through network interfaces 130*c* and 131*a* respectively. End-to-end connection E4 is established using network access links 120*a* and 121*b* through network interfaces 130*a* and 131*b* respectively. End-to-end connection E5 is established using network access links 120*b* and 121*b* through network interfaces 130*b* and 131*b* respectively. End-to-end connection E6 is established using network access links 120*c* and 121*b* through network interfaces 130*c* and 131*b* respectively. The present invention does not limit the number of end-to-end connections to be the number of network access links at gateway 101*a* times the number of network access links at gateway 101*b*. The number of end-to-end connections can be more, equal to or less than the number of network access links at gateway 101*a* times the number of network access links at gateway 101*b*. For example, there may be a plurality of end-to-end connections established using network access links 120*c* and 121*a* together. In another example, no end-to-end connections may be established using network access links 120*c* and 121*a*.

According to one of the embodiments of the present invention, an end-to-end connection, an end-to-end connection is a connection between two network nodes. The end-to-end connection can be implemented by using connection-oriented networking technology or connectionless-oriented networking technology. The end-to-end connection can therefore be implemented by using TCP/IP, UDP/IP, IPSec and/or other different VPN technologies. Thus, when a first network node and a second network node are connected to an end-to-end connection according to the TCP/IP standard, the end-to-end connection is formed between an IP address in the first network node and an address of the second network node.

According to one of the embodiments of the present invention, a first end-to-end connection is implemented by using a plurality of end-to-end connections. For illustration purpose, the first end-to-end connection is between a first network node and a second network node. The first network node has a plurality of IP addresses. The second network node also has a plurality of IP addresses. Each of the plurality of end-to-end connection is formed between one of the first network node's IP addresses and one of the second network node's IP addresses using UDP/IP standard. The first end-to-end connection is formed between one of the first network node's IP addresses and one of the second network node's IP addresses using TCP/IP standard. Data packets belonging to the first end-to-end connection are carried by the plurality of end-to-end connections.

According to one of the embodiments of the present invention, the end-to-end connections are established end-to-end connections such that the end-to-end connections are established before being presented to a user for selection. According to one of the embodiments of the present invention, the end-to-end connections are possible end-to-end connections such that the end-to-end connections are not established before being presented to a user for selection.

Established End-to-End Connections

FIG. 3 illustrates a process according to one of the embodiments. FIG. 3 should be viewed in conjunction with FIG. 1 and FIG. 2. At step 301, the process begins. At step 302, gateway 101*a* establishes a plurality of end-to-end connections with gateway 101*b* through Internet 102 via network access links 121*a*, 121*b*, 120*a*, 120*b* and 120*c*. At step 303, gateway 101*a* provides an interface to a user for selecting at least one of the plurality of established end-to-end connections. Using FIG. 2 as an example, the end-to-end connections are E1, E2, E3, E4, E5 and E6. At step 304, after the user has selected at least one established end-to-end connection, gateway 101*a* received the user's selection through the interface. At step 305, gateway 101*a* transmits data packets to gateway 101*b* through the selected established end-to-end connections, where the data packets are designated for gateway 101*b* and/or hosts connected to gateway 101*b*. The process ends at step 306.

According to one of the embodiments of the present invention, gateway 101*a* sends information of the user's selection to gateway 101*b* after step 304. The information is to instruct gateway 101*b* which established end-to-end connections gateway 101*b* should use for transmitting data packets to gateway 101*a*. Furthermore, the information informs gateway 101*b* identities of established end-to-end connections that it should receive data packets from gateway 101*a*. As a result, gateway 101*a* receives data packets from gateway 101*b* through the selected established end-to-end connections, wherein the data packets are designated for gateway 101*a* and/or hosts connected to gateway 101*a*. Alternatively, gateway 101*a* does not send the information of the user's selection to gateway 101*b* and results in receiving data packets from gateway 101*b* through all established end-to-end connections, where the data packets are designated for gateway 101*a* and/or hosts connected to gateway 101*a*. The decision of whether gateway 101*b* sends data packets to gateway 101*a* using selected established end-to-end connections or all established end-to-end connections based on in part configuration of gateway 101*b*.

Possible End-to-End Connections

FIG. 4 illustrates a process according to one of the embodiments. FIG. 4 should be viewed in conjunction with FIG. 1 and FIG. 2. At step 401, the process begins. At step 402, gateway 101*a* determines possible end-to-end connections that can be established with gateway 101*b*. At step 403, gateway 101*a* provides an interface to a user for selecting at least one of the plurality of possible end-to-end connections. Using FIG. 2 as an example, the end-to-end connections are E1, E2, E3, E4, E5 and E6. At step 404, after the user has selected at least one possible end-to-end connection, gateway 101*a* received the user's selection through the interface. At step 405, gateway 101*a* establishes end-to-end connection(s) based on in part the user's selection. At step 406, gateway 101*a* transmits data packets to gateway 101*b* through the selected established end-to-end connections, where the data packets are designated for gateway 101*b* and/or hosts connected to gateway 101*b*. The process ends at step 407.

According to one of the embodiments of the present invention, gateway 101*a* determines the possible end-to-end connections in step 402 by communicating with gateway 101*b* to retrieve network interface identity of gateway 101*b*. In one variant, in addition to network interface identity, gateway 101*b* provides characteristics of its network interface(s), including IP address, Media Access Control (MAC) address, connection medium, connection technology, performance data statistics and other information that can assist a user to select end-to-end connections. In one variant, only identities of network interface(s) that are available for establishing end-to-end connections are provided by gateway 101*b* to gateway 101*a*.

According to one of the embodiments of the present invention, gateway 101*a* determines the possible end-to-end connections in step 402 by using a default configuration. The default configuration is retrieved from a computer readable storage medium at gateway 101*a* or from a remote host. The default configuration contains network interface identity of a typical gateway that can form end-to-end connections with gateway 101a. For example, gateway 101a through the interface provides a list of its own network interfaces and a default list of network interface of gateway 101b for the user to select. It is possible that gateway 101a does not know the number of network interfaces available at gateway 101b. It is also possible that gateway 101a has not communicated to gateway 101b yet when providing the list of network interfaces of gateway 101b for the user to select. Hence, using a default configuration may result in selected end-to-end connections not being able to be established.

However, using default configuration could allow a user to select possible end-to-end connections regardless whether a gateway at the other end of end-to-end connections is not reachable during selection. For example, gateway 101a provides an interface, which shows its network interfaces 131a and 131b and a list network interfaces retrieved from the default configuration for gateway 101b for a user to select, regardless whether gateway 101a can communicate with gateway 101b.

According to one of the embodiments of the present invention, gateway 101a sends information of the user's selection to gateway 101b after step 404. The information is to instruct gateway 101b to establish end-to-end connections with gateway 101a. In one variant, the information is also to instruct gateway 101b which end-to-end connections should be used for transmitting data packets to gateway 101a. Further, the information informs gateway 101b the identity of established end-to-end connections through which it should receive data packets from gateway 101a. As a result, gateway 101a receives data packets from gateway 101b through the selected established end-to-end connections, where the data packets are designated for gateway 101a and/or hosts connected to gateway 101a. Alternatively, gateway 101a does not send the information of the user's selection to gateway 101b and results in receiving data packets from gateway 101b through all established end-to-end connections, where the data packets are designated for gateway 101a and/or hosts connected to gateway 101a. The decision of whether gateway 101b should send data packets to gateway 101b using selected established end-to-end connections or all established end-to-end connections based on in part configuration of gateway 101b.

According to one of the embodiments of the present invention, when gateway 101a, at step 403, provides an interface to a user for selecting at least one of the plurality of possible end-to-end connections, one or more of the plurality of possible end-to-end connections may not be established with gateway 101b. In such case, gateway 101a is not able to send packets using the selected end-to-end connection(s). In one variant, gateway 101a will inform the user through the interface that one or more of the selected end-to-end connections cannot be established.

Interface

According to one of the embodiments of the present invention, when gateway 101a provides an interface for a user to select end-to-end connections at step 303 and step 403, the interface is a user-interface. The user-interface (UI) can be provided to the user through web technologies, text command, voice control, motion control and/or other techniques that can receive inputs from a user. For example, gateway 101a sends a web page to a mobile phone browser showing that established end-to-end connections E1, E2, E3, E4, E5 and E6 are available for selection. The user then uses a browser to interact with the web page to select at least one of E1, E2, E3, E4, E5 and E6. In another example, a user uses a laptop to connect to gateway 101a through a console port and then use the console port as the interface to select end-to-end connection(s). Authentication may be required before gateway 101a provides the UI to the user.

According to one of the embodiments of the present invention, in order to allow a user to easily identify the plurality of end-to-end connections, the end-to-end connections are assigned with identities. For example end-to-end connections E1, E2, E3, E4, E5 and E6 are assigned with identities "E1", "E2", "E3", "E4", "E5" and "E6" respectively. In another example, end-to-end connections E1, E2, E3, E4, E5 and E6 are assigned with identities "Toronto", "Paris", "New York", "Tokyo", "Not available" and "Not available". The "Not available" identity informs the user that a particular end-to-end connection is not available for selection. The assignment of identities to the end-to-end connections is applicable for established end-to-end connections and possible end-to-end connections.

According to one of the embodiments of the present invention, when gateway 101a provides an interface for a user to select end-to-end connections at step 303 and step 403, the interface is an application programming interface (API). The API can be provided to the user through Internet Protocol (IP), web technologies, and/or other techniques that allow a software running in a device to receive a selection of end-to-end connection(s) from a user and then to send the selection to gateway 101a. For example, an application running in a laptop using the API to retrieve the identities of established end-to-end connections E1, E2, E3, E4, E5 and E6 from gateway 101a and to send the selection of established end-to-end connection(s) received from a user to gateway 101a. The API may further allow gateway 101a to authenticate with the users and recognize the selection. In another example, the API allows an application running in a user's mobile device to interact with gateway 101a through web technologies, including authentication, receiving the identity of end-to-end connections and sending the selections of end-to-end connection(s).

According to one of the embodiments of the present invention, when gateway 101a provides an interface for a user to select end-to-end connections at step 303 and step 403, the established end-to-end connection is represented by pairs of network interfaces and each pair of network interfaces comprise one network interface from gateway 101a and one network interface from gateway 101b. For example, established end-to-end connection E1 is provided to a user for selection through an interface using the identity of network interfaces 130a and 131a. Alternatively, established end-to-end connection E1 is provided to a user for selection through an interface using labels "WAN 1 of Gateway 1" and "WAN 1 of Gateway 2" to network interfaces 130a and 131a respectively. The use of network interface identity is able to assist a user to identify a network interface in the gateway visually.

FIG. 5 is an illustration of a back-panel of gateway 101a according to one of the embodiments. Back-panel 500 comprises Wide Area Network (WAN) interfaces 501, Local Area Network (LAN) interfaces 502 and Universal Serial Bus (USB) interfaces 504. WAN interfaces 501 comprises five Ethernet ports WAN1, WAN2, WAN3, WAN4, and WAN5 which are configured for connecting to one or more WANs. LAN interfaces 502 comprises five Ethernet ports LAN1, LAN2, LAN3, LAN4, and LAN5 which are configured for connecting to one or more LANs. USB interfaces 504 comprises two USB ports that may be used to connect to a wireless WAN, for example, through a USB modem capable of providing mobile internet using wireless technologies, including WiFi, WiMax, 3G, 4G, LTE, etc. Functions of WAN interfaces 501, LAN interfaces 502 and USB interfaces 504 are further explained in FIG. 6, which is an illustration of a user interface through which the user can select network interfaces shown in back-panel 500 to establish end-to-end connections with another gateway.

FIG. 6 illustrates one of the embodiments of the present invention. The plurality of end-to-end connections is presented by WAN identifications shown on WAN interface 501 of back-panel 500 of a gateway. 601 is a web based user interface of a first gateway using HTML to allow a user to select possible end-to-end connections. Label 602 is the name of a profile. Column 603 lists all the Wide Area Network (WAN) interfaces of the first gateway. As shown in column 603, there are six WAN interfaces, namely WAN1, WAN2, WAN3, WAN4, WAN5 and Mobile Internet. Mobile Internet is a WAN using wireless technology, including WiFi, WiMax, 3G, 4G, LTE, etc. Column 604 lists the WAN interface of a second gateway. Pull down list 605 is WAN3. This means that the user has chosen WAN2 of the first gateway to form an end-to-end connection with WAN3 of the second gateway. Pull-down list 606 shows all the possible WAN interface of the second gateway to form another end-to-end connection. There are fourteen WAN interfaces for selection in pull-down list 606. In one variant, the fourteen WAN interfaces are the WAN interfaces of the second gateway that can be connected to the first gateway. In one variant, whether each of the fourteen WAN interfaces can be connected to the first gateway is unknown. In one variant, the second gateway does not have the fourteen WAN interfaces and the fourteen WAN interfaces are shown in the user interface because of a default configuration of the first gateway. In one variant, only two of WAN interfaces, i.e. WAN2 and WAN3, of the first gateway can form end-to-end connections with the second gateway because only WAN2 and WAN3 can communicate with the second gateway. For example, only WAN2 and WAN3 are connected to the Internet.

In one variant, network interfaces at gateway 101*a* and gateway 101*b* are represented by IP address. As an IP address can be assigned to different network interface of a gateway, the use of IP address provides flexibility in choosing network interface to selecting end-to-end connections. In one variant, network interfaces at gateway 101*a* and gateway 101*b* are represented by Media Access Control (MAC) address.

According to one of the embodiments of the present invention, gateway 101*a* provides recommendation through the interface to the user to assist the user in selecting end-to-end connection(s). The recommendation is based, at least in part, on packet loss, latency, bandwidth, and other network characteristics that are observable at gateway 101*a*. The recommendation may be shown to the user through a web page or messages. The recommendation is useful because a user may find difficult to select end-to-end connection(s) if the user is not familiar with the usage of different network characteristics observed. The recommendation can be presented to the user in the form of verbose message, multiple choices, visual symbols, graphics or sounds.

Policy

According to one of the embodiments of the present invention, not all of established end-to-end connections or possible end-to-end connections can be selected by the user. Policies at gateway 101*a* may determine which end-to-end connections can be selected by the user. The policies can be configured by the manufacturer, an administrator and/or a user of gateway 101*a*.

In one of the embodiments, the use of policies is to restrict or to promote certain end-to-end connections for the user to select. A policy may impose conditions to determine which established end-to-end connections or possible end-to-end connections can be selected by the user. For example, referring to FIG. 2, E1, E2, E3, E4, E5 and E6 are the six established end to end connections. A policy may promotes the use of end-to-end connections E1, E2 and E4 and restricts the use of end-to-end connections E3, E5, and E6 by letting the user only select either end-to-end connection E1, E2 and/or E4. A policy may be based on various factors such cost, bandwidth, latency, packet drop rate and/or reliability reasons. For example, using end-to-end connections E1, E2, and/or E4 may be more cost-effective than using end-to-end connections E3, E5, and/or E6, and thus the policy promotes the use of end-to-end connections E1, E2 and E4 and restricts the use of end-to-end connections E3, E5, and E6.

In one of the embodiments, the use of policies is to promote or restrict certain selected end-to-end connections to be used by a gateway to transmit or receive data. For example, a policy determines the time that gateway 101*a* must transmit data packets to gateway 101*b* through the selected end-to-end connections. In another example, a policy determines when gateway 101*a* must stop only using the selected end-to-end connections to transmit data packets to gateway 101*b* and gateway 101*a* may use all end-to-end connections to transmit data packets to gateway 101*b*. In another example, a policy restricts that gateway 101*a* must use the selected end-to-end connections to transmit data packets received from a host, a location or a region to gateway 101*b*. In another example, a policy promotes that gateway 101*a* can use the selected end-to-end connections, in addition to other to end-to-end connections, to transmit data packets gateway 101*b* when the data packets belong to a network protocol specified in the policy. The network protocol includes but not limited to TCP, UDP, SIP, VoIP related network protocol, and video related network protocol. In another example, a policy restricts that gateway 101*a* must use the selected end-to-end connections to transmit data packets received from hosts authenticated using a user's authentication information to gateway 101*b*. In another example, a policy restricts that gateway 101*a* must use the selected end-to-end connections to transmit data packets to gateway 101*b* if the data packets belongs to a specific type specified by the policy.

Those skilled in the arts would appreciate that there are many reasons, including cost, bandwidth, latency, packet drop rate and reliability reasons, why an end-to-end connection should be restricted or promoted to be used by the user.

According to one of the embodiments of the present invention, the policies can also be received by gateway 101*a* remotely through an interface, which can be a UI or an API. The interface allows a user to change one or more policies when necessary.

Aggregated End-to-End Connection

According to one of the embodiments of the present invention, the end-to-end connections belong to the one aggregated end-to-end connection. Therefore, for the perspective of hosts and network devices, such as host 111*a* and 111*b* and network device 110 connected to gateway 101*a*, there is only one aggregated end-to-end connection between gateway 101*a* and gateway 101*b*. For example, host 111*a* is able to establish a TCP FTP session with host 111*c* using the aggregated end-to-end connection to transfer a file from host 111*a* to host 111*c*. Data packets belonging to the TCP FTP session is sent from host 111*a* to host 111*c* through selected end-to-end connection(s), which belong(s) to the aggregated end-to-end connection. In each of the end-to-end connections, data packets can be sent by gateway 101*a* using TCP, UDP or other protocols. Gateway 101*b* is able to reorder the data packets belong to the TCP FTP session and send to host 111*c* using TCP protocol.

According to one of the, label 502 is the profile name of an aggregated end-to-end connection, which is capable of forming two end-to-end connections using WAN2 and WAN3 of a gateway.

System

FIG. 7 is an illustrative block diagram of gateway 701 according to one of the embodiments. Gateway 701 may represent gateway 101*a* and gateway 101*b*. Back-panel 500 may represent the back-panel of gateway 701. Gateway 701 comprises WAN interfaces 702*a*, 702*b*, 702*c*, 702*d*, and 702*e*, LAN interfaces 703*a*, 703*b*, 703*c*, 703*d* and 703*e*, and USB interfaces 708*a* and 708*b*. Gateway 701 further comprises processing unit 704, main memory 706, secondary storage 705, and system bus 707. Processing unit 704 and main memory 706 are connected to each other directly. System bus 707 connects processing unit 704 directly or indirectly to secondary storage 705, WAN interfaces 702*a*-702*e*, LAN interfaces 703*a*-703*e*, and USB interfaces 708*a*-708*b*. Using system bus 707 allows gateway 701 to have increased modularity. System bus 707 couples processing unit 704 to secondary storage 705, WAN interfaces 702*a*-702*e*, LAN interface 703*a*-703*e* and USB interfaces 708*a*-708*b*. System bus 707 can be any of several types of bus structures including a memory bus, a peripheral bus, and a local bus using any of a variety of bus architectures. Secondary storage 705 stores program instructions for execution by processing unit 704.

In one of the embodiments, gateway 701 establishes a plurality of end-to-end connections with another gateway through at least two of WAN interfaces 702*a*, 702*b*, 702*c*, 702*d*, and 702*e* or USB interfaces 708*a* and 708*b*. Gateway 701 uses at least one of the LAN interfaces 703*a*, 703*b*, 703*c*, 703*d*, and 703*e* to connect to a host or a network device, For example, gateway 701 can be connected to a network device through one of the LAN interfaces 703*a*, 703*b*, 703*c*, 703*d*, and 703*e*, and can also be connected to a host through another one of the LAN interfaces 703*a*, 703*b*, 703*c*, 703*d*, and 703*e*. Information of the plurality of end-to-end connections is stored in secondary storage 705. The user of gateway 701 can select at least one of the plurality of end-to-end connections via an interface provided by gateway 701 to the user, and information of the end-to-end connections selected is received by gateway 701 through the interface. Information of the selected end-to-end connections is also stored in secondary storage 705. Gateway 701 transmits data packets via the end-to-end connections selected. The data packets may include the information of the selected end-to-end connections that had been stored in secondary storage 705.

In one of the embodiments, processing unit 704 of gateway 701 determines possible end-to-end connections that can be established with another gateway via WAN interfaces 702*a*, 702*b*, 702*c*, 702*d*, and 702*e* and USB interfaces 708*a* and 708*b*. Information of the possible end-to-end connections is stored in secondary storage 705. The user of gateway 701 can select at least one of the possible end-to-end connections via an interface provided by gateway 701 to the user, and information of the possible end-to-end connections selected is received by gateway 701 through the interface. Information of the possible end-to-end connections selected is stored in secondary storage 705. Gateway 701 establishes end-to-end connections based on in part the user's selection, and transmits data packets via the end-to-end connections established.

In one of the embodiments, policies are stored in secondary storage 705 of gateway 701. The policies may determine which possible end-to-end connections or established end-to-end connections with another gateway can be selected by the user. The policies can be configured by the manufacturer, an administrator and/or user of gateway 701. The policies are retrieved by processing unit 704 from secondary storage 705 through system bus 707 to determine which end-to-end connections should be used to transmit data packets to the another gateway. Alternatively, the policies may be received by gateway 701 from an external server through WAN interfaces 702*a*, 702*b*, 702*c*, 702*d*, or 702*e*, or USB interfaces 708*a* and/or 708*b*, and then stored in secondary storage 705.

According to one of the embodiments of the present invention, gateway 701 is realized by one or more virtual machines at system. The network interface can be implemented by configuration the one or more virtual machines. Those skilled in the art should appreciate there are myriad ways to realize gateway 701 in a system implemented by virtual machines.

BRIEF DESCRIPTION OF DRAWINGS

For a more complete understanding of the present invention. Reference is now made to the following descriptions taken in conjunction with the accompanying drawing, in which:

FIG. 1 is a network diagram illustrating end-to-end connections in a network environment according to one of the embodiments of the present invention;

FIG. 2 illustrates a table representing six end-to-end connections;

FIG. 3 illustrates a process for selecting one or more end-to-end connections according to one of the embodiments;

FIG. 4 a process for selecting one or more end-to-end connections according to one of the embodiments;

FIG. 5 is an illustration of a back-panel of a gateway according to one of the embodiments of the present invention;

FIG. 6 illustrates a user interface for selecting end-to-end connections according to one of the embodiments of the present invention;

FIG. 7 is an illustrative block diagram of a gateway according to one of the embodiments of the present invention.

The invention claimed is:

1. A method for transmitting and receiving data packets between a first network node and a second network node, comprising:

(a) at the first network node, communicating with the second network node to retrieve one or more of a wide area network interface identity, an internet protocol (IP) address, a Media Access Control (MAC) address, a connection medium, a connection technology, and a performance data statistic from the second network node; wherein each of the first network node and the second network node comprises a plurality of wide area network interfaces and at least one local area network interface;

(b) at the first network node, determining possible end-to-end connections between the first network node and the second network node; wherein each of the possible end-to-end connections is assigned with an identity;
(c) at the first network node, providing a recommendation for assisting a user in selecting at least one possible end-to-end connection from the possible end-to-end connections; wherein:
the recommendation is based, at least in part, on packet loss, latency, and bandwidth; and
the recommendation is transmitted using an application programming interface (API);
(d) at the first network node, providing a user interface (UI) for selecting the at least one possible end-to-end connection; wherein the UI is provided through at least one of web technologies, a text command, and voice control;
(e) at the first network node, receiving information describing the selection of the at least one possible end-to-end connection through the UI;
(f) at the first network node, establishing at least one end-to-end connection with the second network node based at least in part on the information describing the selection of the at least one possible end-to-end connection received through the UI; wherein the at least one end-to-end connection is established between at least one wide area network interface of the first network node and at least one wide area network interface of the second network node; and
(g) at the first network node, transmitting and receiving the data packets with the second network node through the at least one end-to-end connection;
wherein:
the at least one end-to-end connection is established by using one of a Transmission Control Protocol (TCP), a User Datagram Protocol (UDP), an Internet Protocol Security (IPsec), and another Virtual Private Network (VPN) technology;
the data packets comprise the information describing the selection of the at least one possible end-to-end connection;
the at least one end-to-end connection is a part of an aggregated end-to-end connection established between the first network node and the second network node; and
the aggregated end-to-end connection is formed when a number of the at least one end-to-end connection is more than one.

2. The method of claim 1, further comprising, at the first network node, receiving a policy to promote or to restrict the selection of the at least one possible end-to-end connection; wherein:
the at least one end-to-end connection is established based at least in part on the policy and the policy is created using the recommendation; and
the information describing the selection of the at least one possible end-to-end connection instructs the second network node to establish one or more end-to-end connections in the possible end-to-end connections.

3. The method of claim 2, wherein:
the policy is to promote or to restrict by the first network node transmitting or receiving the data packets through the at least one end-to-end connection established at step (f); and
the policy is based at least in part on one of (i) time, (ii) expiration, (iii) network protocol, and (iv) user.

4. The method of claim 1, wherein the possible end-to-end connections are represented by pairs of the plurality of wide area network interfaces of the first network node and the second network node and each of the pairs of the plurality of wide area network interfaces comprises one wide area network interface from the first network node and one wide area network interface from the second network node.

5. The method of claim 1, wherein the recommendation is presented via the UI in a form of a verbose message, multiple choices, visual symbols, graphics, or sounds.

6. The method of claim 1, wherein the UI is provided after authenticating the user.

7. The method of claim 1, wherein the UI for the selection of the at least one possible end-to-end connection is the API.

8. A method for transmitting and receiving data packets between a first network node and a second network node, wherein the first network node and the second network node are connected through a plurality of end-to-end connections, comprising:
at the first network node, providing a user interface (UI) for selecting at least one end-to-end connection from the plurality of end-to-end connections; wherein:
the UI provided to a user through at least one of web technologies, a text command, and voice control; and
the selection of the at least one end-to-end connection is based on one or more of a wide area network interface identity, an internet protocol (IP) address, a Media Access Control (MAC) address, a connection medium, a connection technology, and a performance data statistic retrieved from the second network node;
at the first network node, receiving information describing the selection of the at least one end-to-end connection through the UI;
at the first network node, transmitting and receiving the data packets with the second network node through the at least one end-to-end connection;
wherein:
the at least one end-to-end connection is established by using one of a Transmission Control Protocol (TCP), a User Datagram Protocol (UDP), an Internet Protocol Security (IPsec), and another Virtual Private Network (VPN) technology;
the data packets comprise the information describing the selection of the at least one end-to-end connection;
the at least one end-to-end connection is a part of an aggregated end-to-end connection established between the first network node and the second network node; and
the aggregated end-to-end connection is formed when a number of the at least one end-to-end connection is more than one.

9. The method of claim 8, wherein:
the information describing the selection of the at least one end-to-end connection instructs the second network node to use one or more end-to-end connections in the plurality of end-to-end connections for transmitting and receiving the data packets;
the at least one end-to-end connection is selected based at least in part on a policy created using a recommendation at the first network node; and
the policy is to promote or to restrict the selection of the at least one end-to-end connection at the first network node.

10. The method of claim 9, wherein:
the policy is to promote or to restrict the first network node transmitting or receiving the data packets through the at least one end-to-end connection; and
the policy is based at least in part on one of (i) time, (ii) expiration, (iii) network protocol, and (iv) user.

11. A system for transmitting and receiving data packets at a first network node, wherein the first network node comprises:
- at least one processing unit;
- at least one first computer readable storage medium;
- a plurality of network interfaces; and
- at least one second computer readable storage medium storing program instructions executable by the at least one processing unit and configured to cause the at least one processing unit to:
  - (a) communicate with a second network node to retrieve one or more of a wide area network interface identity, an internet protocol (IP) address, a Media Access Control (MAC) address, a connection medium, a connection technology, and a performance data statistic from the second network node; wherein each of the first network node and the second network node comprises a plurality of wide area network interfaces and at least one local area network interface;
  - (b) determine possible end-to-end connections between the first network node and the second network node; wherein each of the possible end-to-end connections is assigned with an identity;
  - (c) provide a recommendation for assisting a user in selecting at least one possible end-to-end connection from the possible end-to-end connections; wherein: the recommendation is based, at least in part, on packet loss, latency, and bandwidth; and the recommendation is transmitted using an application programming interface (API);
  - (d) provide a user interface (UI) for selecting the at least one possible end-to-end connection; wherein the UI is provided to the user through at least one of web technologies, a text command, and voice control;
  - (e) receive information describing the selection of the at least one possible end-to-end connection through the UI;
  - (f) establish the at least one end-to-end connection with the second network based at least in part on the information describing the selection of the at least one possible end-to-end connection received through the UI; wherein the at least one end-to-end connection is established between at least one wide area network interface of the first network node and at least one wide area network interface of the second network node; and
  - (g) transmit and receive the data packet with the second network node through the at least one end-to-end connection;
- wherein:
  - the at least one end-to-end connection is established by using one of a Transmission Control Protocol (TCP), a User Datagram Protocol (UDP), an Internet Protocol Security (IPsec), and another Virtual Private Network (VPN) technology;
  - the data packets comprise the information describing the selection of the at least one possible end-to-end connection;
  - the at least one end-to-end connection is a part of an aggregated end-to-end connection established between the first network node and the second network node; and
  - the aggregated end-to-end connection is formed when a number of the at least one end-to-end connection is more than one.

12. The system of claim 11, wherein:
- the second computer readable storage medium further stores program instructions configured to cause the at least one processing unit to receive a policy to promote or to restrict the selection of the at least one possible end-to-end connection;
- the at least one end-to-end connection is established based at least in part on the policy and the policy is created using the recommendation; and
- the information describing the selection of the at least one possible end-to-end connection instructs the second network node to establish one or more end-to-end connections in the possible end-to-end connections.

13. The system of claim 12, wherein:
- the policy is to promote or to restrict the first network node transmitting or receiving the data packets through the at least one end-to-end connection established at step (f); and
- the policy is based at least in part on one of (i) time, (ii) expiration, (iii) network protocol, and (iv) user.

14. The system of claim 11, wherein the possible end-to-end connections are represented by pairs of the plurality of wide area network interfaces of the first network node and the second network node and each of the pairs of the plurality of wide area network interfaces comprises one wide area network interface from the first network node and one wide area network interface from the second network node.

15. The system of claim 11, wherein the recommendation is presented via the UI in form of a verbose message, multiple choices, visual symbols, graphics, or sounds.

16. The system of claim 11, wherein the UI is provided after authenticating the user.

17. The system of claim 11, wherein the UI for the selection of the at least one possible end-to-end connection is the API.

18. A system for transmitting and receiving data packets at a first network node, comprising:
- the first network node; and
- a second network node,
- wherein:
  - the first network node and the second network node are connected through a plurality of end-to-end connections; and
  - the first network node is configured to perform a method comprising:
    - providing a user interface (UI) for selecting at least one end-to-end connection from the plurality of end-to-end connections; wherein:
      - the UI is provided through at least one of web technologies, a text command, and voice control; and
      - the selection of the at least one end-to-end connection is based on one or more of a wide area network interface identity, an internet protocol (IP) address, a Media Access Control (MAC) address, a connection medium, a connection technology, and a performance data statistic retrieved from the second network node;
    - receiving information describing the selection of the at least one end-to-end connection through the UI; and
    - transmitting and receiving the data packets with the second network node through the at least one end-to-end connection;

wherein:
the at least one end-to-end connection is established by using one of a Transmission Control Protocol (TCP), a User Datagram Protocol (UDP), an Internet Protocol Security (IPsec), and other Virtual Private Network (VPN) technology;
the data packets comprise the information describing the selection of the at least one end-to-end connection;
the at least one end-to-end connection is a part of an aggregated end-to-end connection established between the first network node and the second network node; and
the aggregated end-to-end connection is formed when a number of the at least one end-to-end connection is more than one.

19. The system of claim 18, wherein:
the information describing the selection of the at least one end-to-end connection instructs the second network node to use one or more end-to-end connections in the plurality of end-to-end connections for transmitting and receiving the data packets;
the at least one end-to-end connection is selected based at least in part on a policy created using a recommendation at the first network node; and
the policy is to promote or to restrict the selection of the at least one end-to-end connection at the first network node.

20. The system of claim 19, wherein:
the policy is to promote or to restrict the first network node transmitting or receiving the data packets through the at least one end-to-end connection; and
the policy is based at least in part on one of (i) time, (ii) expiration, (iii) network protocol, and (iv) user.

* * * * *